(No Model.)
M. L. WEAVER.
BRAKE PIPE COUPLING.
No. 563,108. Patented June 30, 1896.
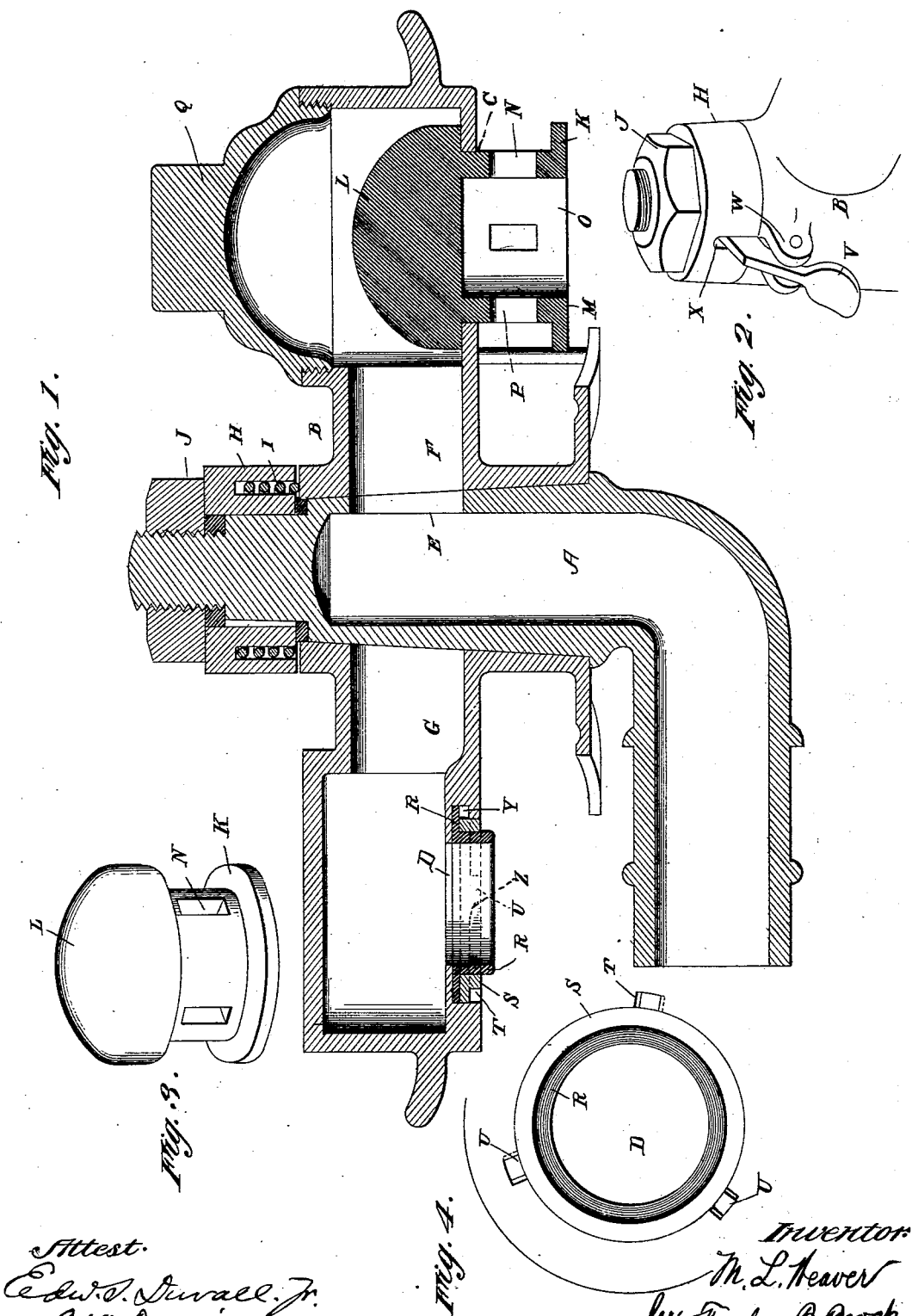

UNITED STATES PATENT OFFICE.

MARTIN L. WEAVER, OF HORNELLSVILLE, NEW YORK, ASSIGNOR OF ONE-HALF TO BLAKE B. BABCOCK, OF SAME PLACE.

BRAKE-PIPE COUPLING.

SPECIFICATION forming part of Letters Patent No. 563,108, dated June 30, 1896.

Application filed January 10, 1895. Serial No. 534,476. (No model.)

*To all whom it may concern:*

Be it known that I, MARTIN L. WEAVER, a citizen of the United States, residing at Hornellsville, in the county of Steuben and State of New York, have invented certain new and useful Improvements in Brake-Pipe Couplings; and I do declare the following to be a full, clear, and exact description of the invention, such as will enable others skilled in the art to which it appertains to make and use the same, reference being had to the letters of reference marked on the accompanying drawings, which form a part of this specification.

Figure 1 represents a central longitudinal section of a train-brake coupling device to which my improvements have been applied. Fig. 2 is a detail perspective view showing my locking-latch thereon. Fig. 3 is a detail perspective view of the air-retaining valve, and Fig. 4 is a detail plan of the port opposite that of the air-retaining valve.

My invention relates to the brake apparatus of railway-cars, whether air, steam, vacuum, or other fluid pressure, for which my improvements may prove suitable or adapted.

The objects of my invention are to provide a brake-pipe with a coupling which will upon accidental or other severance of the train prevent the setting of the brakes upon the forward part, or that part of the train under the control of the engineer, and apply the brakes to the other section or sections beyond his control. If desired, however, by the use of my coupling, the brakes may be set upon both sections of a disconnected train, or the brakes of both sections, when broken, may be kept off.

My invention relates to other details of construction which will be hereinafter referred to.

To attain these objects, my invention consists in the following combination and construction of devices, the details of which will first be fully set forth and described and the features of novelty then referred to and claimed.

In the drawings, A represents the usual angle-plug of a brake-coupling, to the horizontal member of which the brake hose or pipe is attached. The vertical stem is, exteriorly, preferably conical and is plugged or solid at its upper end.

B represents a coupling having two arms F and G, (there may be more than two arms if desired,) which are hollow and provided with ports C and D. The coupling B is vertically cored out or journaled to fit the plug A, upon which it swivels or rotates.

E is a lateral port in plug A. Only one arm F or G may register with port E at the same time, the other arm being cut out and out of action.

H is a collar which is keyed or splined to the plug A and has a recess therein to receive a coiled spring I, a threaded nut J serving to bring the collar and spring under proper tension to make the swiveled joint tight.

K is the air-retaining valve, formed of any substance suitable for the purpose. I have found that molded rubber gives good results. The valve-head L is imperforate and of sufficient substance to cause it to descend normally by gravity to close the port C. It may be of any suitable shape or configuration.

M is the gasket-ring formed integrally with the valve K, and N is an intervening neck uniting the gasket with the valve-head. A longitudinal channel O is made through the gasket into the neck, where a series of lateral ports P communicate. When made of rubber, the valve is inserted through plug Q, the neck and flange collapsing sufficiently to pass through the port.

When the coupling of the adjoining car is not connected thereto, the normal position of the valve K is as shown in the drawings, and the port C is closed by the valve-head. The pressure in the brake-pipe A is exerted upon the head of the valve and acts thereon to close it tightly.

Q is a screw-plug suitably hollowed out interiorly to accommodate the proper movement of the valve and permit its insertion and withdrawal.

The opposite port D of the swiveled coupling is provided with an annular recess for the gasket R.

S is the gasket-ring, having a series of projections thereon, which take into a corresponding series of openings T, which openings communicate with an undercut annular recess Y, having cam-faces Z thereon, against which the projections U impinge and securely fasten the gasket in place by the partial rotation of the gasket-ring. Instead of the recess being cam-faced the projections U on the gasket-ring may be provided with cam-faces. The port D is unprovided with any valve.

V is a pivoted latch hung in suitable bearings W upon the coupler B, and X is a slot in the collar H, of which there are two, by means of which the two-armed coupler may be locked with either end projecting out from the car.

In coupling a train of cars together the port C, provided with the air-retaining valve, is presented for coupling the rear end of the car, and the port D is presented for coupling the forward end of the car. In case of the severance of the train at any point, whether accidental or otherwise, the air-retaining valve on the forward section of the brake immediately comes into action, closing the brake-pipe, and thereby preventing the air from escaping. The engineer therefore does not lose control of his train, or rather the section of it which is connected to the engine, while the air rushes out from the brake-pipe of the detached section, causing the brakes thereon to instantly set. It will thus be seen that the danger of any collisions between accidentally-parted trains by reason of the two sections colliding with one another is obviated because the rear section will be brought to a stop and the forward section under the control of the engineer will keep on subject to his control. Of course there are other obvious advantages flowing from my invention.

When the cars are made up into a train to move in a direction opposite to that last described, the couplings are reversed and locked in that position by the latch V.

It should be understood in connection with this invention that my improved coupling operates in connection with any system of fluid-pressure brake apparatus—such as air or steam—in which auxiliary reservoirs under each car of the train are charged with pressure, said reservoirs being brought into action for setting the brakes of the train by the intentional or accidental opening of the train-brake pipe, either by the engineer, trainmen, passengers, or accidental severance of the coupling or opening of the brake-pipe.

I claim—

1. A brake-pipe coupling having two ports adapted to be interchangeably used, one of which ports is unobstructed and the other being provided with a self-closing valve.

2. A valve made of molded flexible material in one piece provided with an imperforate head, a gasket or flange, an intervening neck provided with lateral ports and a longitudinal port through the gasket and neck connecting with the lateral ports.

3. A pivoted or swiveled brake-pipe coupling member having opposite arms one of which is provided with an open port, and the other with a self-closing valve.

4. A pivoted coupling having opposite arms provided with ports in each end thereof one unobstructed and the other having a valve, a pivot spindle or plug, and a collar fast on the plug and a latch engages the plug for locking the coupling when its arms are reversed.

5. In a pipe-coupling, the combination of a gasket-seat having recesses, and a gasket-retaining ring having projections thereon adapted to engage said recesses, one of the parts being cam-faced.

6. The combination of the hollow brake-pipe spindle or plug having a lateral port, a two-armed coupling swiveled thereon, and ports in each arm of the coupling, one of which is open and the other provided with a self-closing valve.

7. The combination of the hollow brake-pipe spindle or plug a pivoted coupling swiveled thereon, having one arm unobstructed and the other provided with a valve a collar fast upon the plug, a lock-stop upon the collar, a latch or lock upon the coupling adapted to engage the lock-stop, a spring interposed between the collar and coupling, and a nut for adjusting the tension.

In testimony whereof I affix my signature in the presence of two witnesses.

MARTIN L. WEAVER.

Witnesses:
JOHN D. GROVES,
WILLIAM L. TRAVERS.